(12) United States Patent
Messina et al.

(10) Patent No.: US 9,087,129 B2
(45) Date of Patent: Jul. 21, 2015

(54) METHODS, SYSTEMS, AND SOFTWARE FOR AUTOMATED GROWTH OF INTELLIGENT ON-LINE COMMUNITIES

(75) Inventors: Christopher P. Messina, Cambridge, MA (US); Nabeil O. Sarhan, Warwick, RI (US); Shinpei Kuga, Cambridge, MA (US)

(73) Assignee: ENERGICO ACQUISITIONS L.L.C., Dover, DE (US)

( * ) Notice: Subject to any disclaimer, the term of this patent is extended or adjusted under 35 U.S.C. 154(b) by 0 days.

(21) Appl. No.: 13/168,434

(22) Filed: Jun. 24, 2011

(65) Prior Publication Data
US 2012/0023094 A1    Jan. 26, 2012

Related U.S. Application Data

(63) Continuation of application No. 10/725,351, filed on Dec. 1, 2003, now abandoned, which is a continuation of application No. PCT/US02/09626, filed on Mar. 29, 2002, said application No. 10/725,351 is a
(Continued)

(51) Int. Cl.
*G06F 17/30* (2006.01)

(52) U.S. Cl.
CPC ................. *G06F 17/30864* (2013.01)

(58) Field of Classification Search
CPC .................................................. G06F 17/30864
USPC .................................................. 707/770–771
See application file for complete search history.

(56) References Cited

U.S. PATENT DOCUMENTS

| 4,190,057 A | 2/1980 | Hill et al. |
| 5,487,756 A | 1/1996 | Kallesoe et al. |

(Continued)

FOREIGN PATENT DOCUMENTS

| EP | 0 848 338 | 6/1998 |
| JP | 06-301577 | 10/1994 |

(Continued)

OTHER PUBLICATIONS

Ramos, Claudiney V., et al.; "Cooperative querying in relational databases"; Published Nov. 15, 1997; p. 190-198; http://ieeexplore.ieee.org/xpl/articleDetails.jsp?arnumber=637091.

(Continued)

*Primary Examiner* — Monica Pyo
(74) *Attorney, Agent, or Firm* — Stolowitz Ford Cowger LLP

(57) ABSTRACT

To address problems related to interface differences and disunity among on-line services, such as newsgroups message boards and forums, the present inventors devised systems, methods, and software for automating the posting and retrieval of content across different on-line services as well as encouraging growth of active on-line communities. One exemplary system includes a posting module, a retrieval module, and a web server. The posting module allows users to create and initiate data postings that are sent automatically to several newsgroups, message boards, and/or other on-line information sources. The retrieval module automatically retrieves replies to the postings at each of the on-line sources and presents them through the webserver for user review and further reply, eliminating the need for users to repeatedly visit posting sites in search of reply messages. In addition to the retrieved replies, the retrieval module automatically finds and retrieves content based on stored search or fitness criteria, ultimately enabling its integration into the content of one or more websites or databases for convenient user access.

64 Claims, 7 Drawing Sheets

Related U.S. Application Data continuation-in-part of application No. 10/103,536, filed on Mar. 20, 2002, now Pat. No. 7,162,508, which is a continuation of application No. PCT/US00/25886, filed on Sep. 20, 2000.

(60) Provisional application No. 60/294,070, filed on May 29, 2001, provisional application No. 60/154,885, filed on Sep. 20, 1999.

(56) References Cited

U.S. PATENT DOCUMENTS

| | | | |
|---|---|---|---|
| 5,517,405 A | 5/1996 | McAndrew et al. | |
| 5,623,660 A | 4/1997 | Josephson | |
| 5,708,825 A | 1/1998 | Sotomayor | |
| 5,799,151 A | 8/1998 | Hoffer | |
| 5,822,518 A * | 10/1998 | Ooki et al. | 726/6 |
| 5,864,874 A | 1/1999 | Shapiro | |
| 5,870,725 A * | 2/1999 | Bellinger et al. | 705/45 |
| 5,890,149 A | 3/1999 | Schmonsees | |
| 5,890,157 A | 3/1999 | Kawamoto | |
| 5,987,302 A | 11/1999 | Driscoll et al. | |
| 6,064,978 A | 5/2000 | Gardner et al. | |
| 6,073,105 A | 6/2000 | Sutcliffe et al. | |
| 6,128,602 A | 10/2000 | Northington et al. | |
| 6,292,796 B1 | 9/2001 | Drucker et al. | |
| 6,314,425 B1 | 11/2001 | Serbinis et al. | |
| 6,343,990 B1 | 2/2002 | Rasmussen et al. | |
| 6,493,703 B1 | 12/2002 | Knight et al. | |
| 7,162,508 B2 | 1/2007 | Messina | |
| 7,752,251 B1 | 7/2010 | Shuster et al. | |
| 2002/0062368 A1* | 5/2002 | Holtzman et al. | 709/224 |
| 2003/0061215 A1 | 3/2003 | Messina | |
| 2004/0172415 A1 | 9/2004 | Messina et al. | |
| 2007/0282842 A1 | 12/2007 | Messina | |

FOREIGN PATENT DOCUMENTS

| | | |
|---|---|---|
| JP | 07-049875 | 2/1995 |
| KR | 10-487846 | 9/2000 |
| KR | 10-0386781 | 2/2001 |
| KR | 10-2000-0029554 | 5/2005 |
| WO | 99/44152 A2 | 9/1999 |
| WO | 01/22292 A2 | 3/2001 |
| WO | 01/24045 A2 | 4/2001 |
| WO | 02/097678 A1 | 12/2002 |

OTHER PUBLICATIONS

Kamel, Eman, et al.; "A TNET Database Server for Production Flow Control"; Published Nov. 15, 1997; p. 1-6; http://ieeexplore.ieee.org/xpl/articleDetails.jsp?arnumber=702620.

International Search Report for corresponding PCT Application No. PCT/US02/09626; dated Jun. 28, 2002; 4 pages.

International Search Report for corresponding PCT Application No. PCT/US00/25866; dated Aug. 2, 2002; 6 pages.

Supplementary European Search Report for Application No. EP 02 72 5402; dated Oct. 5, 2005; 5 pages.

Japanese Application Serial No. 2003-500788; Office Action mailed Aug. 26, 2008; 2 pages.

Korean Application Serial No. 10-2003-7015626; Office Action mailed Sep. 11, 2008; 20 pages.

U.S. Appl. No. 11/639,365; Non-Final Office Action mailed Oct. 15, 2008; 7 pages.

U.S. Appl. No. 11/639,365; Response filed Apr. 15, 2009 to Non-Final Office Action mailed Oct. 15, 2008; 5 pages.

Japanese Application Serial No. 2003-500788; Office Action mailed Jun. 24, 2009; 2 pages.

U.S. Appl. No. 11/639,365; Final Office Action mailed Jun. 26, 2009; 7 pages.

Nagaratnam, Nataraj, et al.; "Resource Access Control for an Internet User Agent"; Third USENIX Conference on Object-Oriented Technologies (COOTS); Jun. 16-20, 1997; Portland, Oregon; 11 pages; http://static.usenix.org/publications/library/proceedings/coots97/full_papers/nagaratnam/nagaratnam_html.

Basu, Chumki, et al.; Recommendation as Classification: Using Social and Content-Based Information in Recommendation; AAAI-98 Proceedings; 1998; 7 pages; https://www.aaai.org/Papers/AAAI/1998/AAAI98-101.pdf.

Jiang, Haitao; WVTDB—a semantic content-based video database system on the World Wide Web; Published Dec. 1998; http://ieeexplore.ieee.org/xpl/articleDetails.jsp?arnumber=738359.

* cited by examiner

FIGURE 4

METHODS, SYSTEMS, AND SOFTWARE FOR AUTOMATED GROWTH OF INTELLIGENT ON-LINE COMMUNITIES

CROSS-REFERENCE TO RELATED APPLICATIONS

This application is a continuation of U.S. Ser. No. 10/725,351 filed Dec. 1, 2003, which is a continuation of PCT/US02/09626 filed Mar. 29, 2002 which claimed priority provisional patent application Ser. No. 60/294,070 filed May 29, 2001. U.S. Ser. No. 10/725,351 filed Dec. 1, 2003 is also a continuation-in-part of U.S. Ser. No. 10/103,536 filed Mar. 20, 2002, now U.S. Pat. No. 7,162,508 issued on Jan. 9, 2007, which is a continuation of PCT/US02/25886 filed Sep. 20, 2000 which claims priority to provisional patent application Ser. No. 60/154,885 filed Sep. 20, 1999. All of the above-identified applications are incorporated herein by reference.

COPYRIGHT NOTICE AND PERMISSION

One or more portions of this patent document may contain material subject to copyright protection. The copyright owner has no objection to the facsimile reproduction by anyone of the patent document, as it appears in the Patent and Trademark Office patent files or records, but otherwise reserves all copyrights whatsoever. The following notice applies to this document: Copyright © 1999-2002, Body1, Inc.

BACKGROUND

Recent years have seen the explosive growth of the Internet as not only a communication system of global scope, but also a global digital library. Indeed, the Internet has become a key source of news and information on a full spectrum of topics for users the world over.

Fueling this growth, millions of users have submitted, or posted, information to services, such as public newsgroups, message boards, and subscription mailing lists, that provide a relatively simple and inexpensive mechanism for users to share information electronically with many people. However, despite success in rapidly increasing the quantity of information on the Internet, the present inventors have recognized that these services suffer from at least two problems that ultimately limit the utility and value of their vast stores of user-generated information.

The first problem concerns the accessibility of the information stored by these services. Specifically, many services use their own unique form of user interface for posting and finding relevant information. This diversity, or lack of standardization, requires users of multiple services not only to learn different interfaces, but also to post and search messages on each service separately, even when the services focus on related topics. Although some interfaces allow the searching of several newsgroups for current and past articles, most, if not all, of them require users to repeatedly define and initiate searches to check for new relevant postings. Moreover, some services delete the oldest submissions or content on a weekly basis, reducing chances of users finding the content most relevant to their needs.

The second problem is the lack of an effective mechanism for collecting related information in a central database. In particular, many newsgroups and message boards focus on similar, highly related topics; yet they are not otherwise integrated or associated with each other or to other online sources of similar information, such as theme-oriented websites. For example, there are numerous independent health-oriented newsgroups, forums, message boards, and health-oriented websites in direct competition. This disunity forces users seeking the best user-generated information and potentially more authoritative, professionally authored information on a given topic to search multiple services and websites. Additionally, because many participants behave as spectators and do not actively contribute information, the direct competition not only leads to fragmented collections of information, but also divides the communities of active users across multiple services, frustrating the development of larger user communities.

Accordingly, there is a need not only to improve the value and utility of the vast stores of information on the Internet through new modes of access and collection, but also to encourage the growth of on-line communities.

SUMMARY

To address this and other needs, the present inventors devised exemplary systems, methods, and software for automating the posting and retrieval of content from multiple data services, such as newsgroups, message boards, forums, as well as encouraging active participation and growth of on-line communities.

For example, one system includes a posting module, a retrieval module, and a web server. The posting module, accessible through a webpage on the server, allows users to create and initiate data postings that are sent automatically to several newsgroups, message boards, and/or other on-line information sources. The retrieval module automatically retrieves replies to the postings at each of the on-line sources and presents them through the webserver for user review and further reply, eliminating the need for users to repeated visit posting sites in search of reply messages. In addition to the retrieved replies, the retrieval module automatically finds and retrieves content of any file type based on stored search or fitness criteria, ultimately enabling its integration into the content of one or more websites or databases for convenient user access.

Other aspects of this exemplary system include a feedback module for adapting fitness criteria over time to regulate the content of the databases according to user or administrative desires. Specifically, the exemplary system adapts the fitness criteria based on user interaction with retrieved data and/or the content of user-generated postings, thus promoting evolution of website toward user interests.

Another system deploys the automated posting-and-retrieval capabilities within a webserver system that grants users data-access rights based on their contributions or submissions to one or more databases. This system scores the contributions based on quantity, quality, and/or relevance, granting access rights based on the scores and thus promoting further contributions. Additionally, it records the queries of users of the database and facilitates communications between users having similar queries as well as users making similar contributions, further promoting growth of a communities of users around shared information.

BRIEF DESCRIPTION OF DRAWINGS

FIG. 4 is a facsimile of a graphical user interface (or webpage) 400 suitable for use with system 100.

DETAILED DESCRIPTION OF EXEMPLARY EMBODIMENT(S)

The following description, which references and incorporates one or more figures, describes and illustrates one or more exemplary embodiments of the invention. These embodiments, offered not to limit but only to exemplify and teach, are shown and described in sufficient detail to enable those skilled in the art to make and use the invention. Thus, where appropriate to avoid obscuring the invention, the description may omit certain information known to those of skill in the art.

Exemplary System Architecture and Method of Operation

Figure 1:
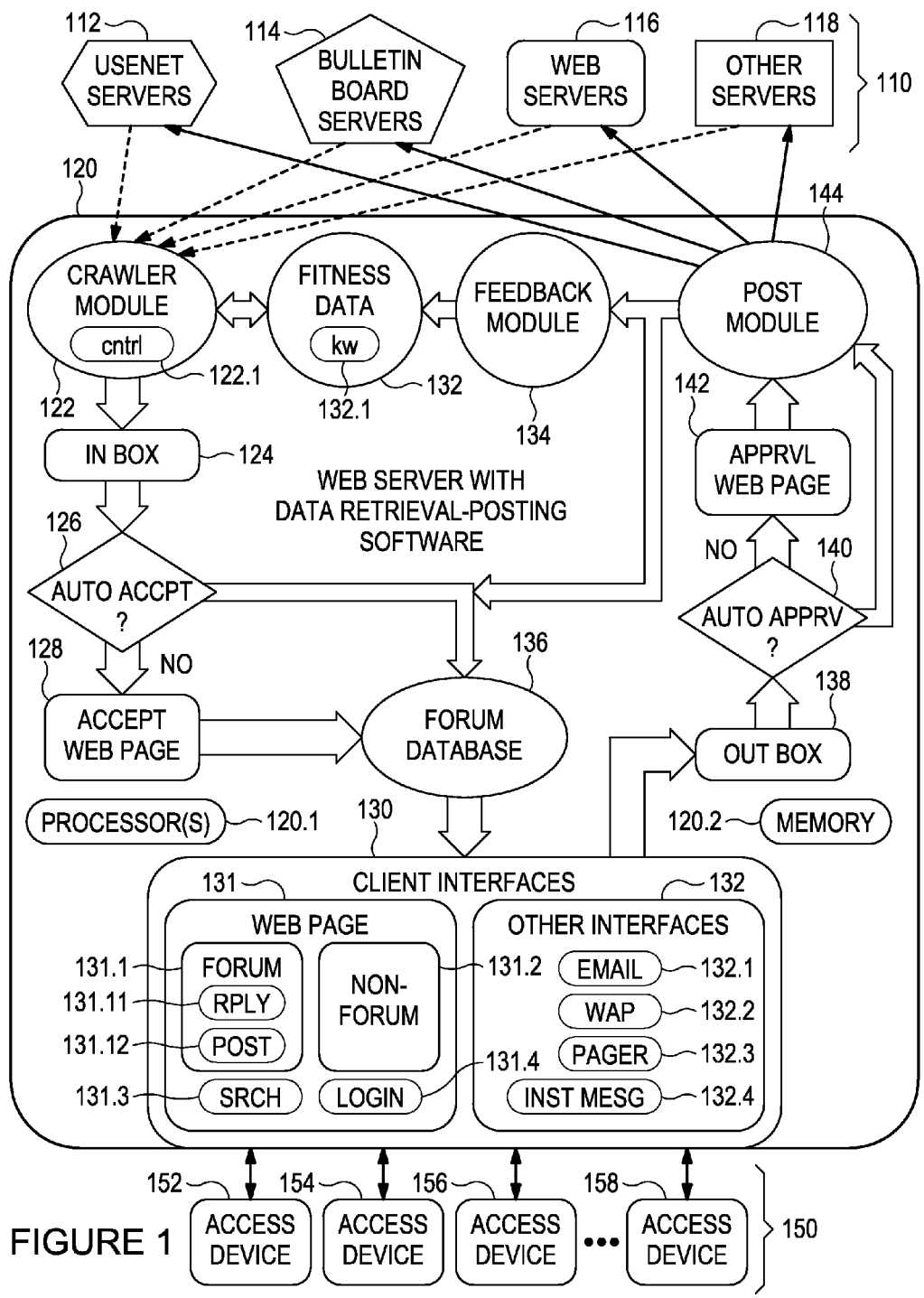
FIG. 1 is a hybrid block-flow diagram of an exemplary data-retrieval-and-posting system 100 incorporating teachings of the present invention.

FIG. 1 shows an exemplary automatic data-posting-and-retrieval system 100. The connecting lines in the figure indicate that various components of the system are interconnected permanently or temporarily via a wired or wireless wide-area-network, such as the Internet, or a secure wired or wireless local-area networks, such as a corporate intranet. They further indicate through use of arrowheads, whether communications over the connections are generally one-way or two-way. System 100 includes servers 110 (at top of figure), user access devices 150 (at bottom), and a web server system 120 (in the middle).

More particularly, servers 110 include one or more types of servers, such as one or more Usenet (NNTP or network-news-transfer protocol) servers 112, one or more bulletin or message-board servers 114, one or more web servers 116, and one or more other types of database servers 118, such as mail servers, messaging servers, and file servers. The invention, however, is not believed to be limited to any particular collection of servers or server types. Indeed, the invention is not limited to specific file type, since for example, various embodiments can retrieve graphics, video, audio, text, olfactory, and biofeedback files.

User access devices 150 include access devices 152, 154, 156, and 158 are representative. The term "access device," as used herein, encompasses browser-equipped personal computers, network appliances, personal digital assistants, telephones, cell phones, web phones, televisions, web television, etc. Thus, the present invention is not limited to any particular class or form of access device.

Selectively coupled between servers 110 and access devices 150 is webserver system 120 which not only automatically retrieves and post data from and to servers 110, but also provides a common interface structure between these servers and access devices 150.

Specifically, webserver system 120 includes, in addition to conventional processors 120.1 and memory 120.2 (shown in lower left and right corners), various software and data components which can take a variety of forms, such as coded instructions or data on an electrical, magnetic, optical, and/or magnetic carrier medium. These components, arranged to show an exemplary software architecture and methodology, include a crawler module 122 (upper left corner of box), inbox 124, decision block 126, acceptance webpage 128, client interfaces 130, fitness database 132, feedback module 134, and forum database 136. Additional components include outbox 138, decision block 140, approval page 142, and post module 144.

Crawler module 122 generally searches one or more external databases, accessible via servers 110, for data items or content based on search or fitness criteria defined in fitness database 132. The databases searched are defined in a control database 122.1.

The control database includes one or more site-, group-, or user-specific master subscription list of newsgroups and other servers, which are maintained by a system administrator, individual user, or automated software. Some embodiments can also automatically assess the fitness of new newsgroups and other network-accessible information sources based on a sampling of their content and then automatically add or recommend addition of newsgroups and sources that meet the given fitness or relevancy criteria to the control database or specific portion of the database. Newsgroup suggestions can also be triggered by looking at messages that others posted on multiple new groups, since these messages may suggest some similarity of newsgroup focus. (In addition, control database 122.1 stores control and state about a target information space. This is used to memorize state of the information space from the crawler module's point of view should the information space be dynamic or temporal.)

In the exemplary embodiment, crawler module 122 is implemented as a scheduled service (or daemon) that connects to a networked data servers via sockets, automatically sending appropriate access information (for example, user-names, passwords or other security credentials). Additionally, fitness database 132, which is initially supplied with at least one keyword or more generally content attribute 132.1 from an administrator and modified by feedback module 134, with each attribute associated with an indicator of whether it is desirable or undesirable, and a magnitude indicator of the relative strength or relative priority the crawler module should apply to the attribute in evaluating content for retrieval. The present invention is not limited to any particular type or class of content attributes. For example, some embodiments use attributes related to source code, object code, applets, particular binary data sequences, digital watermarks, file names, file sizes, file types, headers, tags, and metadata, markup languages, and semantic concepts.

More precisely, the crawler module uses a two-part screening process. The first evaluates the content prior to retrieval based solely on inclusion or exclusion of specific content attributes, such as keywords 132.1, defined in fitness database 132. (Some embodiments generate and retrieve summaries or facsimiles of found content rather than the found content in its entirety.) The second filters the initially retrieved content data based on full-text keywords search using an objective fitness function having the form $$TotalFitness = \sum_{i=1}^{N} \text{weight}(k_i) freq(k_i), \quad (1)$$

where N denotes the total number of keywords from the fitness database or relevant subportion of the fitness database that are in the text (or more generally content) being evaluated; $freq(k_j)$ denotes the frequency of the i-th keyword within the text being evaluated; and $weight(k_j)$ denotes the current weight assigned to the i-th keyword. This can be normalized or scaled numerous ways, for example, by standard decimal scaling into a particular range, such as zero to one.

Some embodiments use non-linear fitness functions. For example, one embodiment uses the following fitness function:

$$TotalFitness' = \sum_{i=1}^{N}\left(weight(k_i)\sum_{j=1}^{freq(k_i)} j\right),\qquad(2)$$

where the weight for each keyword is the same as in equation (1), but the effect of each keyword on TotalFitness' increases non-linearly with each additional occurrence of the keyword. To illustrate, the following table compares the fitness contributions for various frequencies of a keyword that has an associated weight of 4, computed using equations (1) and (2):

| Frequency | Linear Total Fitness | Non-Linear TotalFitness' |
|---|---|---|
| 1 | 1(4) = 4 | 1(4) = 4 |
| 2 | 2(4) = 8 | (1 + 2)(4) = 12 |
| 3 | 3(4) = 12 | (1 + 2 + 3)(4) = 24 |

In some embodiments, a configuration file or graphical interface feature allows administrators, users, or groups to select between use of equations (1) and (2) for fitness measurements. (Selection and adjustment of the fitness function, for example, via an administrative interface, facilitates granular control over the search results.) Still other embodiments use other fitness functions and/or expand the range of selectable fitness-measurement options with other fitness functions based for example on combinations or variations of equations (1) and (2) and/or on weights that are functions of frequency and/or other document parameters. Some embodiments apply different fitness functions to different sources, source types, or file types.

Other embodiments associate one or more sets of keywords and/or weights in the fitness database with specific users or groups of users. (Users may be identified by their use of specific access credentials, such as username and password.) Additionally, some embodiments store user-defined Boolean and natural-language queries and/or necessary credentials and payment authorizations to access commercial or other restricted-access databases.

If the fitness for a particular document is greater than a threshold (a number provided during configuration, (most often set to 0, but can be made more restrictive for low memory environments) then the entire information file (text, source, time and other information associated with the content) is copied to inbox 124.

Inbox 124 simply aggregates all data retrieved from servers 110. However, some embodiments assign the data to one or more specific users or groups of users based on the user- or group-specific fitness criteria that led to its retrieval. Still other embodiments provide user- or group-specific inboxes.

Decision block 126 determines whether to automatically forward the contents of inbox 124 to forum database 136 or to queue it for further automated or manual screening. In the exemplary embodiment, this determination entails checking the status of an auto-acceptance flag. If the flag is true, the data is transferred to forum database 136, and if the flag is false, indicating no automatic acceptance, the data is incorporated into webpage 128 for manual screening.

Other embodiments use user-, group-, topic- or source-specific auto-acceptance flags. Still others combine user-, group-, topic- or source-specific auto-acceptance flags with temporal-window definitions to allow for automatic acceptance of certain defined content for certain users during certain windows of time. And still other embodiments define the auto-acceptance flag as a function of not only user, group, topic, source, and time, but also additional relevance or legal criteria. (See discussion of auto-approval flag relative to decision block 140 below.)

Webpage 128 shows contents of inbox 124 and enables a website administrator or other authorized entity, to individually accept or reject each retrieved item. This information can be viewed as a complete scrollable listing or a sublisting based on a fitness threshold or range of fitness scores. Webpage 128 also allows an administrator to alter fitness values of some information files, with any alterations ultimately translated to the keyword scores in fitness database 132.

Figure 2:
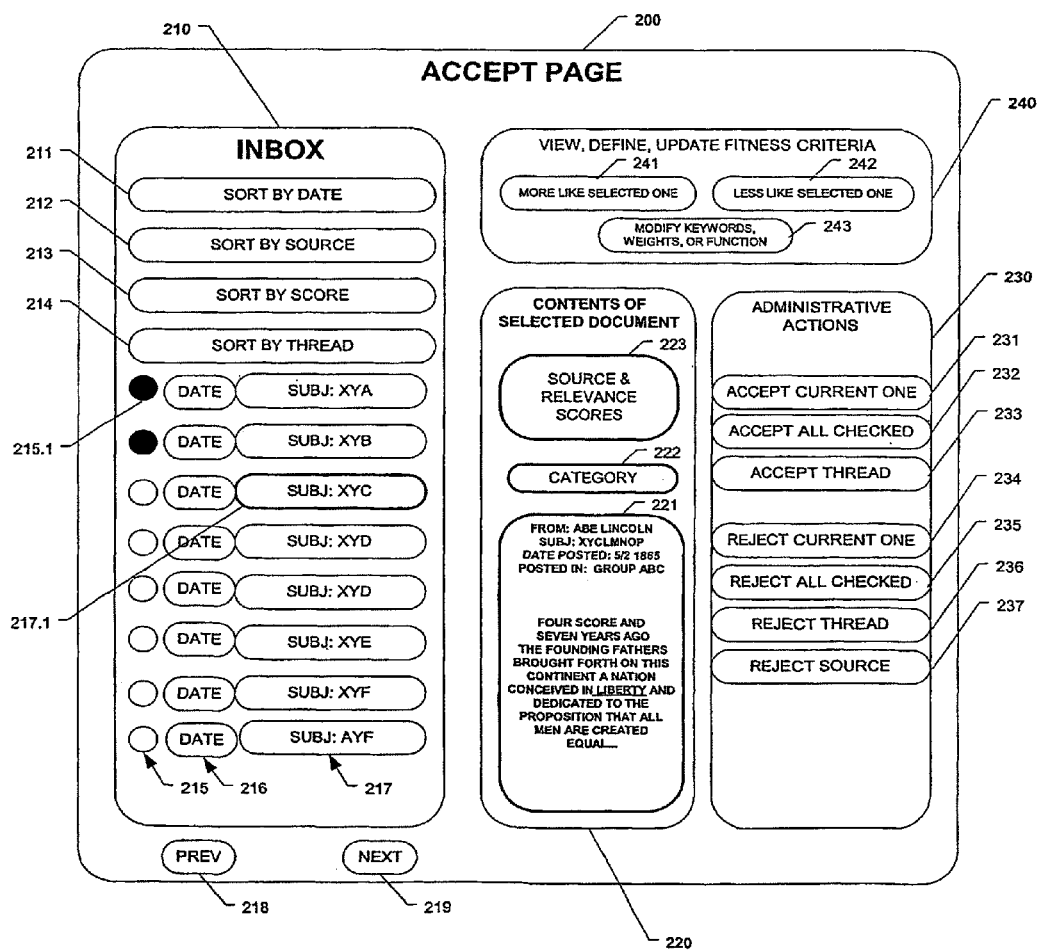
FIG. 2 is a facsimile of a graphical user interface (or webpage) 200 suitable for use with system 100.

FIG. 2 shows an exemplary webpage or graphical user interface 200 used in an alternative embodiment of webpage 128. Interface 200 includes an inbox display region 210, a selected-content display region 220, administrative action region 230, and a fitness update region 230. Inbox display region 210 includes sort-command inputs 211-214, item markers 215, item date indicators 216, item identifiers 217, previous input 218, and next input 219. Sort-command inputs 211-214 invoke sorted display of inbox items by date, by source (or origin), by fitness score, and by thread. Item markers 215 are selectable to mark or designate one or more of the displayed items for further action. Item marker 215.1, representative of a selected marker, is filled in to denote its selected status. Item-date indicators 216 indicate respective dates, such as dates of retrieval or dates of original posting at a particular source, associated with the displayed items. Item identifiers 217 which are selectable independent of item markers 216, present indicia of the content of the retrieved items current displayed in inbox display region 210. Item identifier 217.1, representative of a selected marker, is shaded to denote its selection. Selected content display region 220 displays content and other data associated with selected data item in the inbox. Administrative action region 230 includes command inputs 231-237, which provide options to accept all data items marked in the inbox or accept an entire thread associated with a selected data item.

Figure 3:
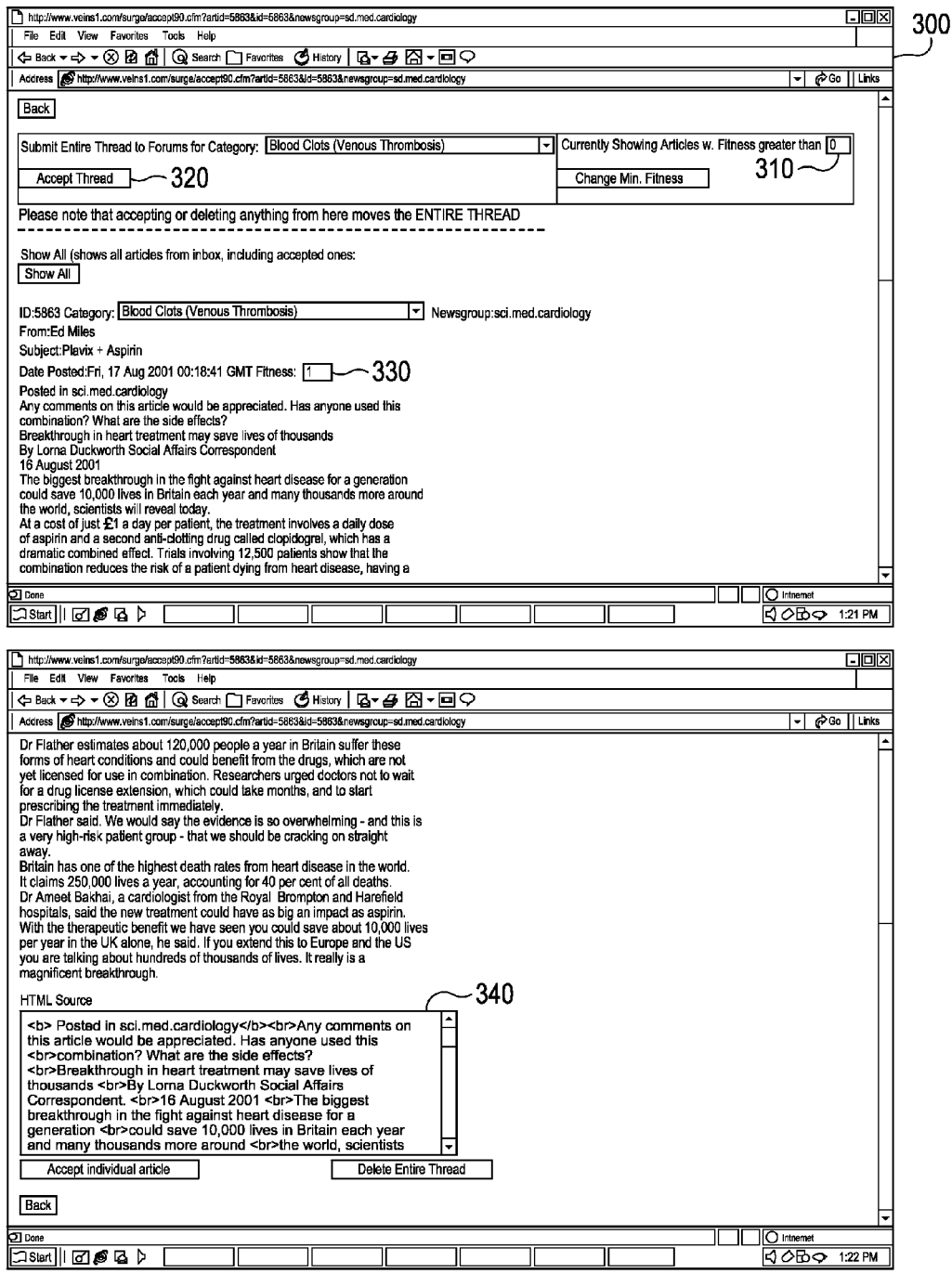
FIG. 3 is a facsimile of a graphical user interface (or webpage) 300 suitable for use with system 100.

FIG. 3 shows another alternative webpage or graphical user interface 300 useful as an alternative or addition to webpage 128. Notably, webpage 300 includes an input 310 for inputting a fitness level that causes display of all items having a fitness greater than the input fitness level, an input 320 for causing acceptance of a retrieved discussion thread into a specific designated category. Input 330 shows the computed fitness of the displayed item; however, this fitness may be changed by an administrator. (Such a change will ultimately result in modification will be counted as a positive or negative event for relevant content attributes in the fitness database.) Region 340 shows markup language associated with or embedded within the displayed content.

As FIG. 1 indicates, content that is accepted via an interface such as webpage 128, 200, or 300, is stored (or referenced via hyperlink or other pointer) in forum database 136 for subsequent access via one or more clients (access devices) through client interfaces 130, which include a graphical-user interface, such as webpage 131 and other interfaces 133.

Figure 4:
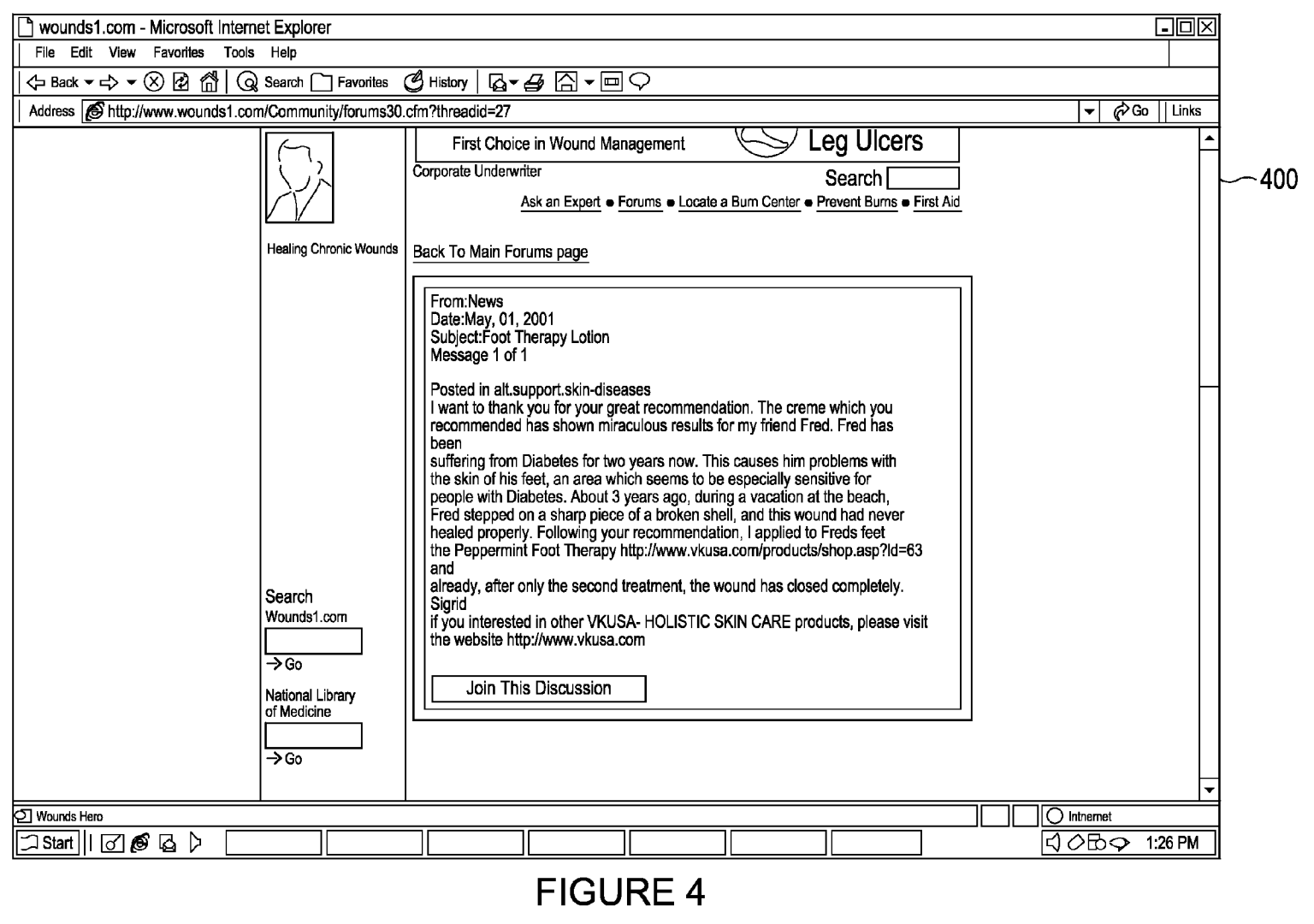
Figure 5:
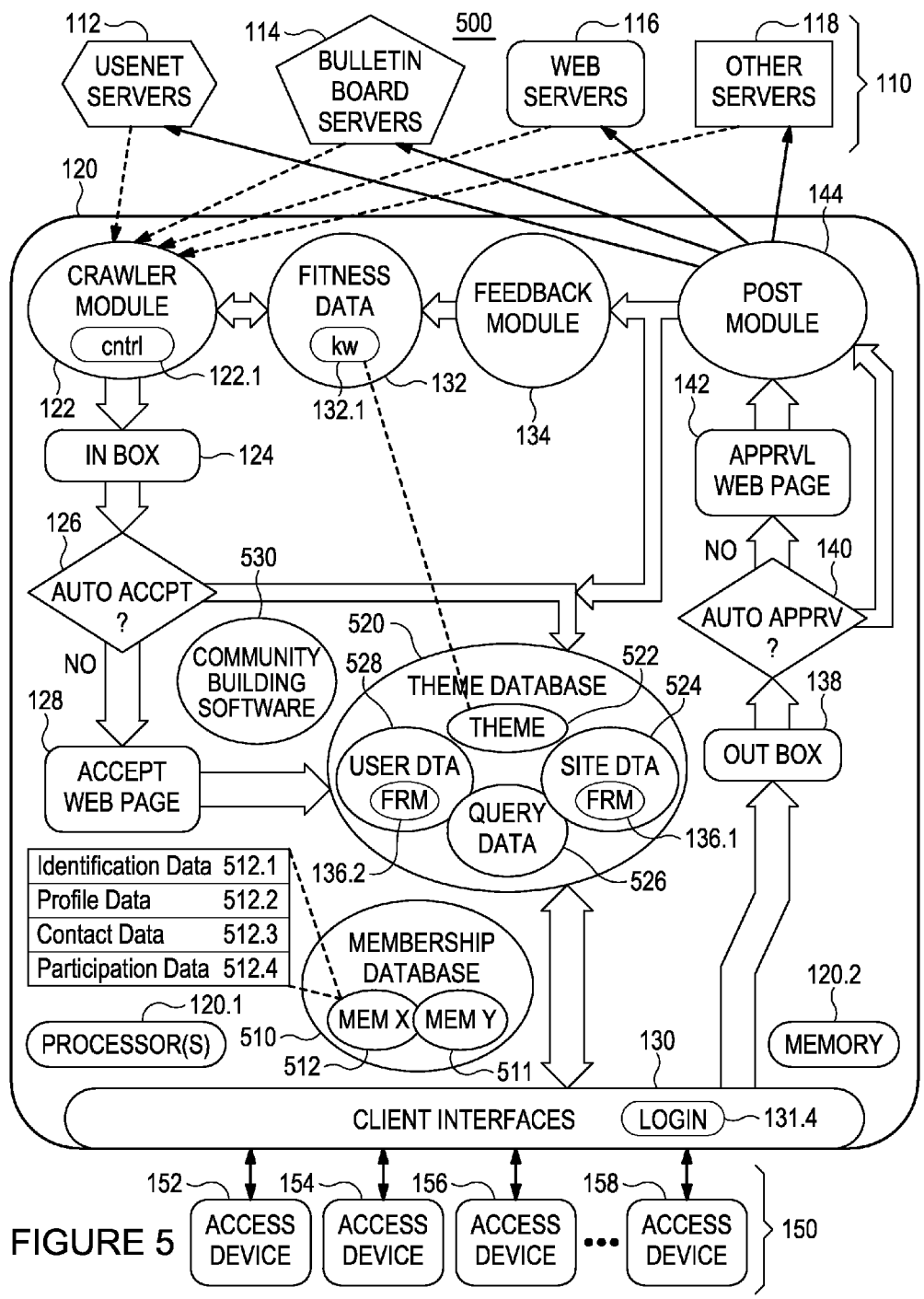
FIG. 5 is a hybrid block-flow diagram of an exemplary system 500 based on system 100.

Webpage 131 presents the contents of forum database 136 in combination with other non-forum content to one or more specific users or groups of users. Specifically, webpage 131, which is associated with one or more theme-oriented or general-interest websites, includes a forum region 131.1, a non-forum region 131.2, a search region 131.3, and a login region 131.4. Forum region 131.1 provides access to all or a user- or group-specific portion of forum database 136, and non-forum portion 131.2 provides access to other website content. (FIG. 4 shows an exemplary webpage 400, which is displayed in response to forum region 130.1, and FIG. 5 shows a webpage that is displayed in response to selection of an identifier for a retrieved item on page 400)

Forum region 131.1 includes a reply region 131.11 and a post region 131.12. Selection of reply region 130.11 allows a user to reply to one or more messages in forum database without having to navigate to the source of the messages. And, selection of post region 131.12 allows a user to post original messages to one or more newsgroups, bulletin boards, and mailing lists.

In some embodiments, forum database 136 organizes the retrieved content into categories based on total fitness and/or particular keyword scores to assist users in locating specific content.

Search region 131.3 invokes a search interface on webpage 131 to allow users to search against already retrieved content or to command specific natural-language, Boolean, or structured-query languages (SQL) searches against all the newsgroups or particular newsgroups or data sources using the crawler module or one or more separate search engine. In some embodiments, the search interface provides users the option to define target data and target date for receiving search results, such as overnight, next two days, or within a week, or within a month. During the specified time, the crawler module (or one or more other search engines) will search multiple sources across the internet for the target data. For some searches, the system will report search results via email, instant message, page, etc. Still other embodiments allow users to navigate through the forum database, select one or more particular items, and then invoke display of other retrieved items that are most similar to the selected items or command a search based on the contents of the selected items.

In addition to webpage 131, client interfaces includes other interfaces 133. This set of interfaces includes any other conventional or emerging interface structure or protocol recognition and conversion facilities necessary to communicate with any available or emerging form of access device. Thus, for example, other interfaces 133 includes an email interface 133.1 for communicating via email with one or more accesses devices, a wireless-access-protocol (WAP) 133.2 for communicating webpages to mobile devices, such as cell phones and personal-digital assistants; a pager interface 133.3 for communicating with pagers, and an instant-messaging interface for communicating using one or more instant-message protocols.

Outbox 138 serves as a first-in-first-out queue for outgoing reply and post messages from all users of the website(s) originating from client interfaces 130. However, other embodiments provide user- or group-specific outboxes. Outbox 138 outputs to decision block 140.

Decision block 140 determines whether to automatically forward the contents of outbox 138 to post module 144 or to queue it for further automated or manual screening. In the exemplary embodiment, this determination entails checking the status of an auto-approval flag, a preset true-false flag. However, other embodiments employ a more complex auto-approval process which entails measuring the fitness of the user original or supply post in a similar manner as used to evaluate incoming data within crawler module 122 and automatically approving postings that satisfy a threshold fitness level or fitness range.

Some of these embodiments relax the fitness criteria for internally generated postings (submissions) relative to the criteria for importing externally generated postings: Still others define the auto-approval flag as a function of user, group, topic, source, time, legality, and/or relevance criteria, including fitness data. Thus, the present invention is not limited in terms of the type of auto-approval decision process. In any event, if the flag is true, the data is transferred to post module 144, and if the flag is false, indicating no automatic acceptance, the data is incorporated into webpage 142 for further screening.

Webpage 142 provides access to contents of outbox 138 and enables a website administrator or other authorized entity to individually screen reply and post items. In the exemplary embodiment, webpage 142 follows a similar layout as webpage 200 or 300, as shown in FIGS. 2 and 3 respectively. In some embodiments, webpage 142 includes one or more of the following additional control features, beyond what is shown in FIGS. 2 and 3: query-author feature for sending a email to the author (assuming extraction of email address from message or public address book) or for querying forum content (or broader internet for other content from this author; an evict-author feature for deleting all content from a particular author from the forum database and preventing retrieval of his or her items; a reject-similar feature for rejecting all items that are very similar to a marked or selected item based on a conventional semantic analysis, a check-legality feature for comparing the item to a listing of pirated or likely-to-be pirated content.

If an item is disapproved for posting, a system message is generated and transmitted to the author of the message. For disapproved postings that meet or appear likely to meet fitness criteria of other affiliated forums, websites, or databases (based on a list and other criteria held by webserver 120), some embodiments provide messages that refer users, via a hyperlink, to another website with its embodiment of system 100. Disapproved items, in some embodiments, are posted externally as desired, but shunted to a separate area of forum database reserved for non-conforming content. Approved items are forwarded to post module 144.

Post module 144 distributes items, based on explicit or implicit approval, to one or more of servers 110 and forum database 136. In distributing the items, post module 144 performs any necessary data and/or protocol conversions as necessary to ensure acceptance at each of the destinations. (Post module 144 also includes one or more hyperlinks, designating webpage 131, an associated recruitment page, affiliate websites, forums, etc.)

The exemplary embodiment implements post module 144 as a service (daemon) and that operates according to a schedule defined during configuration. For example, post module 144 can be scheduled to post hourly, daily, etc. Other embodiments drive post module on an event basis, such as immediately on receipt of a new item for posting or after accumulating a predetermined number of new items. In some embodiments, posted items originating from webpage 131 are posted directly to forum database 136, bypassing outbox 138 and the subsequent approval process.

Post module 144 also identifies keywords and/or concepts in the posted items and forwards this information to feedback module 134.

Feedback module 134 modifies or adapts fitness criteria to reflect greater or lesser desirability of content having specific attributes. In the exemplary embodiment, adaptation occurs in response to user or administrative actions on content containing specific keywords. Specifically, the exemplary embodiment treats user responses that reflect approval or disapproval of crawler-retrieved content as triggers to modify fitness criteria. Modifying the fitness criteria entails increasing or decreasing specific keyword weights or attribute weights, adding or deleting certain keywords, or more generally changing a parameter in a given fitness function or changing fitness functions. For example, a user reply to a crawler-retrieved message or click on a link of a crawler-retrieved webpage signal content approval, whereas deletion or inattention to retrieved items signal disapproval.

Other embodiments collect more direct user feedback through polling or surveying users regarding how useful a particular retrieved document is and then adjusting the fitness criteria accordingly. For instance, one embodiment includes "more like this one," "less like this one," or "no more like this one" buttons in the frame of a content-display page to receive direct user input regarding desirability of particular content. Another embodiment uses a multi-point rating system. Common examples of such systems include four, five, and ten points. Administrative actions, such as changing the fitness score of a retrieved item or rejecting data in the inbox can also signal an opportunity for adjustment of fitness criteria.

In response to a detected opportunity for adjustment, the exemplary embodiment generates and sends an information file containing text of the relevant document and any associated user-created documents to the fitness module. In turn, the feedback module not only searches the associated information file for keywords that are present in fitness database 132, but also identifies new keywords or other semantic attributes for inclusion in the database. The weights for preexistent keywords are then increased or decreased by some marginal amount or percentage based on a desired sensitivity or control loop dynamic. Weights for new keywords are initially set at the marginal weight and allowed to evolve to other keyword weights in response to user interactions with content containing the keywords or other weighted attributes.

One embodiment adjusts the weights of keywords based on positive or negative interactions with retrieved items. Specifically, after a predetermined number of positive or negative interactions with a specific retrieved (or original) item, the feedback module adjusts weights of all relevant keywords (or other attributes, such as source, author, header tags, size) by respective predetermined amount for positive and negative interactions. For example, if the threshold number of interactions for triggering an adjustment is 100 interactions, the positive adjustment is +1.1, and the negative adjustment is −0.9. Thus, every 100 positive or negative interactions would cause a 10% increase or decrease in the relevant attribute weights and thus a corresponding impact on the net growth or expansion of the forum or website content.

In some embodiments, administrators may also skew the fitness functions or keyword (or databases in specific ways for specific periods of time to encourage or discourage specific types of content. Thus, for example, for a political website, an administrator (or administrative program incorporating semantic analysis) might assess whether the forum database had a balance of content on both sides of an issue, such as increasing taxes, and adjust the fitness function or keyword weighting to establish or maintain balance. Alternatively, if balance was not desired in all or a portion of the forum database, the fitness function or attribute weighting could be adjusted, again by an administrator or administrative program, to achieve the desired mix of content along one or more semantic dimensions.

Other embodiments also update the fitness data or criteria to include new keywords, concepts, or attributes of original and/or reply postings. The feedback module has the ability to modify keyword weights based on the utility (fitness, number of replies, acceptance rate of similar posts) of a given post. In addition, the feedback module could also suggest new keywords by identifying similarities between posts deemed to be useful.

Exemplary Applications

Exemplary system 100 and its various components have countless applications. For example, system 100 can be used as an intelligence gathering mechanism by corporations, non-profits, individuals, and government agencies. For example, corporations interested in assessing their public images or product appeal can set up a website using the exemplary software or a suitable variant to collect relevant postings from multiple forums, message boards, etc. Moreover, the corporations may post specific content, such as advertising or product testimonials, to incite a "public" response. Additionally, the exemplary software can be used to post classified advertising for goods and services to multiple forums, to collect survey data, to conduct a multi-bid-point auction.

System 100 can also treat emails from one or more associated email servers as postings or content for retrieval. From the perspective of posting, these embodiments monitor content from all or specific outgoing or incoming emails and modify the fitness functions to reflect a desirability of the content in these emails. Additionally, some embodiments include a further option to find new, previously undesignated recipients for the email (or posting) from a continually updated list of website members or newsgroups, mail lists, etc. Notably, this email feature can also be deployed within a group or organization to identify relevant content from emails, such as job skills found on resumes or detect transfer of sensitive information.

Further applications include: supplemental subscription-based search service for web portals, such as Google or AltaVista; aggregation and organization of data of multiple file types across all or a subset of nodes in a corporate intranet to facilitate use of employee-generated data, such as address books, expense reports, etc; finder for rare items, missing persons, experts, professionals; search across company-specific portals for relevant online posts, such as resumes, new customers, or technical competencies.

Exemplary System 100 with Community-Building Software

FIG. 5 shows an enhanced version of system 100 in the form of an exemplary webserver system 500. In addition to the components of system 100, system 500 includes membership database 510, theme database 522, and community-building software 530.

Membership database 510 includes information regarding members or potential members (users) of system 500. The figure shows this information as representative records 512 and 514, which are substantially identical in structure. In the exemplary embodiment, record 512 includes member-identification data 512.1, member-profile data 512.2, member-contact or -linking data 512.3, and member-participation data 512.4. Member-identification data 512.1 includes data for identifying or authenticating the identity of a user. Member-profile data 512.2 includes data describing the professional biographies and credentials of the member. Member-contact data 512.3 includes data, such as one or more postal addresses, telephone numbers, e-mail addresses, or URLs for facilitating contact or communications with the associated user. And, member-system-participation data 512.4 includes quantitative and qualitative information regarding actual and permitted use of the system by each user. For instance, the exemplary embodiment maintains one or more access scores for each member, indicating levels of access to respective portions of theme-oriented database 520.

Theme-oriented database 520 includes theme data 522, site data 524, query data 526, and user data 528. Theme data 522 includes one or more keywords, terms, concepts, or website addresses which define one or more aspects of the thematic or topical content of database 520. (In some embodiments, fitness data 132 and theme data 522 comprise the same data.) Exemplary themes or topics includes general healthcare and wellness information for humans or other animals, such as dogs, cats, or fish; specific healthcare information for various parts of the human body, such as joints (knees, hips, elbows, spine, etc.) or organs (heart, lungs, stomach, kidney, liver, eyes, ears, skin, etc.); specific medical conditions, such as allergies (food, plant, etc.), cancer, arthritis, obesity, mental illness; auto-immune deficiency (HIV). Other exemplary topics include technology breakthroughs, health-technology breakthroughs, children, cooking, sports, entertainment, celebrities, politics, law, restaurants, consumer products, motion pictures, videos, music recordings, corporations, government officials, criminal activity, schools, science, wines, beers, foods, professional service providers (lawyers, doctors, contractors, artisans, etc.) colleges, alumni of educational institutions, genealogy, gossip, or sex. One exemplary health-oriented database includes user-generated health content, medical journal content, and an archive of health-oriented feature stories. Thus, the present invention is not limited to any particular theme or class of themes.

Site data 524 includes feature articles, journal articles and other content added to database 524 manually by its creators, sponsors, or other parties governing or maintaining the database or automatically by the system itself. Query data 526 includes a listing of one or more queries (or query summaries) made by registered users or members of the community, against the database, with each query associated with one or more portions of the membership data for its submitting member. User data 526 includes user contributions to the database, with each contribution logically associated with or appended to one or more portions of the membership data for its submitting member. Site data 524 includes forum database 136.1 and user data 526 includes a user-specific forum database 136.2.

In its exemplary operation, system 500 not only facilitates posting, retrieval, and searching of content across multiple on-line data services, but also promotes the intelligent growth and development of a theme-oriented database or website by awarding users data-access rights based on their data contributions and new-member referrals, and promoting further interaction of system users.

Exemplary System Operation

Figure 6:
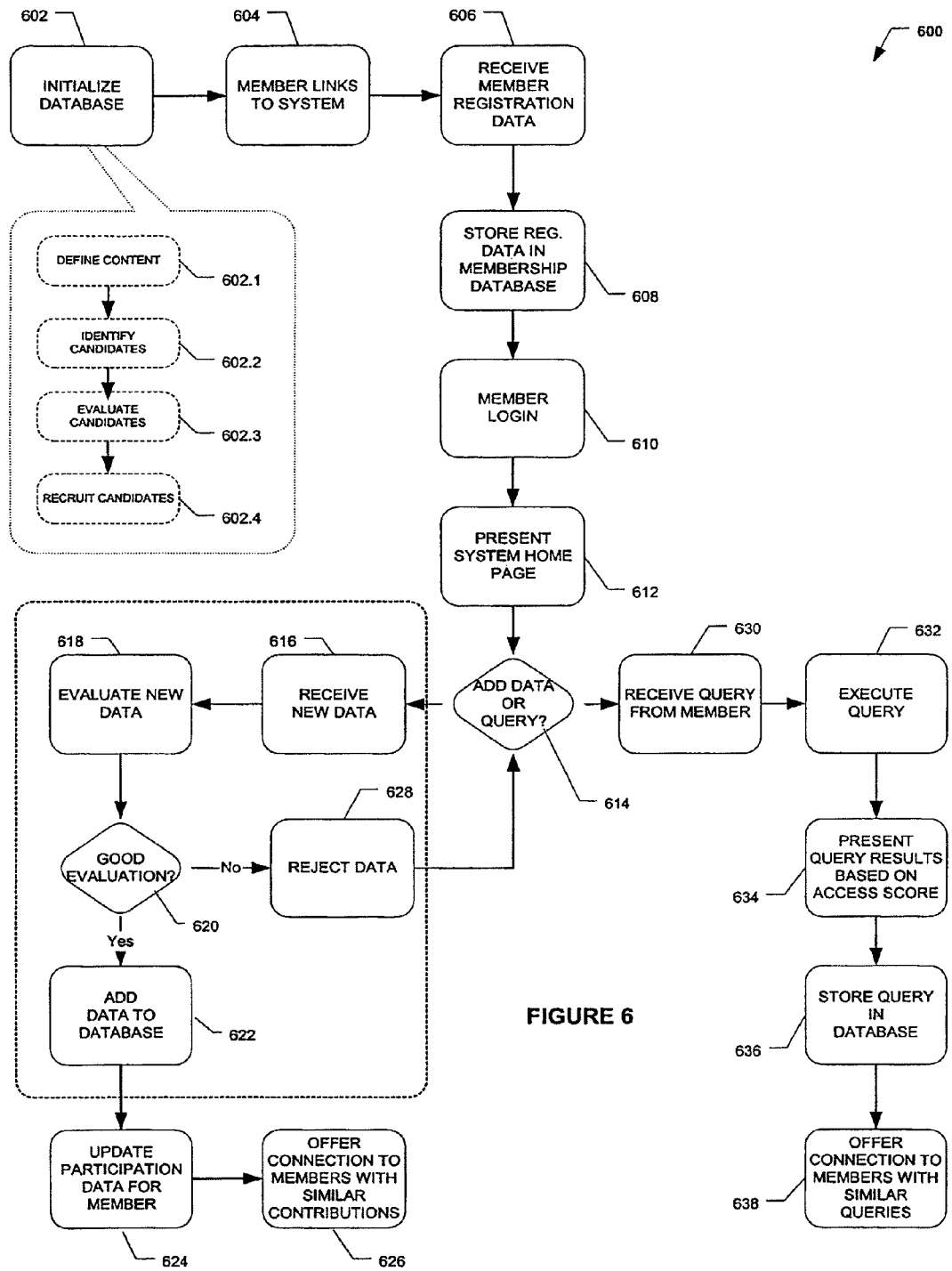
FIG. 6 is a flow chart illustrating an exemplary method of operating system 100.

More specifically, FIG. 6, which shows an exemplary flowchart 600, illustrates an exemplary method of operating system 500. Flow chart 600 includes blocks 602-638, which are executed serially in the exemplary embodiment. However, other embodiments of the invention may change the order of execution and/or execute two or more blocks in parallel using multiple processors or a single processor organized as two or more virtual machines or subprocessors. Moreover, still other embodiments implement the blocks as two or more specific interconnected hardware modules with related control and data signals communicated between and through the modules. Thus, the exemplary process flow is applicable to software, firmware, and hardware implementations.

The exemplary method begins at block 602, with automatically or manually establishing an initial version of theme-oriented database 520. To this end, the exemplary method executes blocks 602.1-602.4.

Block 602.1 entails determining a theme or topic by storing one or more keywords, semantic concepts, or other content attributes in fitness database 132 and/or theme data 642. The data in the fitness data and theme data are initially the same data or at least related to the same topic. However, some embodiments may use dissimilar data. The theme or fitness data, in some embodiments, identifies one or more key experts or authorities in a particular field. This allows for retrieving content authored by these experts or content that references them and thus potentially determining by association others experts and so on. Once the theme or topic of the database is determined, execution continues at block 602.2.

Block 602.2 entails identifying a set of one or more candidate members. Exemplary candidate members include existing websites or portions of websites related to the theme and persons or firms with expertise or indicated interest in the theme. The publishers of identified publications or websites are then invited to register as members of the system. The exemplary embodiments identifies them by conducting searches based on the content attributes and/or conducting searches based on relevant journals, research citations, articles, posts, periodical subscription lists, or expressed interest in electronic newsletters, requests in online or offline forums or bulletin boards. Identification can also include polling existing experts, contributors, and/or community members.

After identification of a set of candidates, the exemplary method evaluates them in block 602.3. This entails sorting them into three classes: experts, contributors, and community to facilitate prioritization of recruiting efforts. Although some embodiments employ subjective manual sorting techniques, the exemplary embodiment applies an quantitative algorithm that assesses the degree of overlap of candidate recommendations using a "6 degrees of separation" model which assumes that more widely known expert, contributors, or community members should have greater relative stature (access rights) with the website. An alternative algorithm determines a ranking based on the research citations, number, and quality of research papers, and number and quality of posts, number of press citations regarding the theme or fitness data, recency of relevant posts, informational requests, publications, or press citations.

Some embodiments use crawler module 122 capability to parse metadata attached to retrieved content together with its fitness algorithms to conduct quantitative and/or statistical analysis of content. In these embodiments, crawler module 122 targets content from one or more candidate members using its metadata, and measures and stores the fitness of the data, ultimately enabling one to readily determine statistics, such as the average fitness of content posted by a given author within one or more specific on-line data services. More generally, the method could be used to assess the average fitness of all content for a particular online data service or a content author. The availability of such statistics facilitates comparison or ranking of content providers or authors in any number of desirable ways. Indeed, the highest ranking set of providers may become targets of high-priority recruitment efforts, and/ or included with the content attributes driving crawler-module retrievals to ensure a steady input of high-quality content to the website.

Additionally, some embodiments use this methodology to cull poor-performing on-line data services from the search space of the crawler module and to suggest addition of new ones. Still other embodiments may cluster other types of metadata, such as copyright, publisher, geographic origin of data, date of origin, around measured fitness levels, enabling use of conventional database querying to calculate a wide range of statistics, for example, average fitness of data posted from a specific geographic region. (Other embodiments with appropriate semantic analyzers may be able to infer meta data from the content itself.)

After identification, execution then continues at block 602.4. This block entails recruiting or inviting one or more of the expert, contributor, or community candidates to join the website. In the exemplary embodiment, the initial recruiting efforts include manual or automated transmission of e-mail, letter, or telephonic solicitations to join. Incentives, such as data-access rights, but a financial stake in the website community, reciprocal web-traffic opportunities, publicity or other promotion, and priority access to events or new information (information access rights)—or combinations thereof. Others include direct financial compensation based on the quality, quantity, and relevance of contribution provided by the expert, contributor, or community member.

In other embodiments, recruiting entails crawler module 122 posting messages encouraging participants of newgroups, message boards, etc., from which it retrieves content, to visit or request information about one or more of its affiliated websites. In some cases, the messages includes hyperlinks or URLs to the site and some incentive for visiting the website, such as an electronic coupon or gift certificate or bonus access rights to otherwise inaccessible content on the site. Some embodiments even reply directly to specific retrieved postings with such messages. An exemplary message might state that based on the content of your post, you would be interested in the one or more of the following websites, on-line forums, newsgroups, etc.

In an event after initialization in block 602, execution of the exemplary method proceeds to block 604. Block 604, one or more of the candidate members establish a communications link with the system through webserver 120. This entails each of the candidate members using an access station, such as access device (or station) 152, to invoke the URL to the system. For example, the user at access station 152 would invoke "www.domain-name.com" to connect her computer system (or other network appliance) to webserver system 120. After establishing the link to webserver 120 execution proceeds to block 606.

Block 606 entails receiving registration information from the candidate member. The registration information includes member-identification data, member-profile data, member-contact or -linking data, and member-system-participation data. Member-identification data includes data for identifying or authenticating the identity of a user, such as a username and password. Member-profile information includes professional biographical information, such as present employment, professional achievements, educational or other promotional type material indicating or suggesting the authority or credibility of the registering member in the topic. Member-contact data includes data, such as one or more postal addresses, telephone numbers, e-mail addresses, or URLs for facilitating contact or communications with the associated user. Member-system-participation data includes an access score that governs the level of access that the associated member has over theme-oriented database 520. The exemplary system determines an initial access score based on whether the user was referred by an existing member, or whether the user was given a special invitation based on his or her expertise in the theme. If an existing member referred the user, the access score for the existing member is increased upon registration of the new user. After all registration information has been received for a particular member, exemplary execution proceeds to block 608.

In block 608, the system records the received registration information in membership database 510. Although the exemplary embodiment maintains membership database 510 separate from theme-oriented database 520 for heightened security, some embodiments combine the databases. With recording of the registration information, the exemplary method advances to block 610.

Block 610 entails the new member logging into the system to access theme-oriented database 520. Specifically, this entails the new (or an existing) member manually or automatically entering a username and password, for example at login region 131.4 (shown as part of webpage 131 in FIG. 1) in client interfaces 130. (Existing members bypass blocks 602-608 to reach block 610.) The username and password are then verified against those in membership database 510. Affirmative verification advances the exemplary method to block 612.

In block 612, the system presents the member a home page, such as webpage 131 in FIG. 1, for theme-oriented database 520. From the home page, the member decides to query database 520 or to contribute data to database 520 as indicated by decision block 614.

A member decision to make a contribution to the database branches execution to block 616, which entails receiving a contribution from the member. In this exemplary embodiment, contributions include posting or responding to a post at one or more on-line database services, such as forum data 136.1 within site data 524, or one or more other affiliated on-line services using post module 144. It also includes referring or inviting one or more new members to the website. In some embodiments, contributions also include responses to one or more survey or polling features on the website, or even clicking through to affiliate or sponsor websites. Execution then continues to block 618.

In block 618, the system evaluates or scores the contribution based on its quantity, quality and/or relevance to the theme-oriented content of database 520. To evaluate data contributions, the exemplary embodiment uses the evaluation logic of crawler module 122 and the fitness data in theme database 522 and/or fitness database 132. Another embodiment converts the contribution to a natural-language query and executes this query against all or part of database 520. The natural-language searching algorithm produces quantitative measures of the relevance of the contribution. Other embodiments produce the relevance or quality measures using inverse-document-frequency factors that favor rare terms and/or frequency factors which favor terms that are in the document to be scored. In some embodiments, the contribution is summarized using specialized software, such as that described in U.S. Pat. No. 5,708,825, entitled Automatic Summary Pages Creation and Hyperlink Generation, which is incorporated herein by reference. Other embodiments score the contribution based on additional factors, including for example, length (number of words), number of citations to leading journals, inclusion of hyperlinks to predetermined cites (such as sponsors of the system) and/or grammar. Still other embodiments score the contributions manually using an editorial board of experts in the theme. And still other embodiments factor in the credibility or stature of the author based on previous contributions to the website.

Execution then continues at decision block 620, where the system determines if the evaluation was good or not. That is, is the contribution of sufficient relevance and quality to be added to database 520. If the contribution has a good evaluation, based for example on its score exceeding some threshold value, the system proceeds to block 622.

In block 622, the system adds the contribution to database 520. In the exemplary embodiment, this entails appending the username along with one or more portions of the member's member-profile information and/or member-contact information to the beginning and/or end of the contribution. (Some embodiments use a side by side presentation approach for the contribution and its attribution.) Thus, other members accessing this information can identify its contributing member and assess credibility and authority of the contribution. Moreover, if a contributing member has elected to allow publication of its contact information, such as its e-mail address, future users of the information may establish communications with the contributor. Publication of a hyperlink or URL associated with the contributor will offer opportunities for reciprocal web traffic from webserver 120 to a webserver associated with the contributing member, creating an incentive for further contributions to the theme-oriented database.

In block 626, after adding the contribution to database 520, the system updates the access score portion of the participation data for the member based on the score of the contribution. In the exemplary embodiment, this entails adding the score of the contribution to the initial or previous access score in membership database 510. However, other embodiments adopt other forms of update.

In block 626, the system offers the contributing member an opportunity to connect with one or more other members who have made similar contributions to database 520. In the exemplary embodiment, this entails defining a query based on the contribution and executing this query against the user data portion of database 520, more precisely user data 528. Based on the results of this query, the exemplary embodiment presents one or more usernames and related contact or biographical information for other members who have made similar contributions to the database, thereby facilitating communications between the contributing member and other contributing members.

On the other hand, if the block 620 contribution had a poor evaluation based on the threshold, execution proceeds to block 628 which outputs a message to the member indicating that the contribution was rejected. Some embodiments may offer an explanation for the rejection, and others refer the member to an alternate system with an appropriate theme for receiving the information. Still others reroute the contribution to the alternate system, automatically enrolling the member in the alternate system by transferring a copy of the associated membership information. After rejecting the data, execution returns to decision block 614, where the member can choose to add new data or to submit a query for database 520.

From block 614, a decision to query database 520 branches execution to block 630, which entails receiving a query from the member. Although the scope of the invention encompasses queries of any number of forms, the exemplary embodiment accepts queries as a textual string with Boolean connectors or as a natural-language query. (Moreover, the exemplary embodiment permits the member to restrict the query to specific portions of theme-oriented database 520, such as to site data or user data.) Execution of the exemplary method then proceeds to block 632.

In block 632, the system executes the query against database 520. In the exemplary embodiment, this entails running the query against the entirety of database 520. However, some embodiments restrict the query to one or more portions of database 520.

In block 634, the system presents query results to webserver 120 for viewing by the member through an access station. The exemplary embodiment presents the query results based not only on the query and the contents of database 520, but also on the access score for the member. Thus, for example, a low access score may result in all or a portion of the results being withheld from the member. Some embodiments advise the member quantitatively regarding the withheld portion of the results. For example, the system presents a message that a certain percentage of the results is withheld. Other embodiments present citations for the portions being withheld to assist the member in determining the desirability of this withheld information. Variations of this approach may present the profile of the contributors of the withheld results.

In presenting the results to the requesting member, the exemplary system arranges or organizes the results based not only on relevance to the query presented but also on factors, such as the access rights of the respective contributors of data to the system. Thus, for example, data contributions from contributors that have accrued relatively high access rights are generally presented before data contributions from contributors with relatively lower access rights, assuming the contribution are of approximately equal relevance to the query. This presentation mechanism further encourages members, particularly those with related websites, to contribute content to the database.

Some embodiments present the results in a predetermined order based on the portions of the database that contain them. For example, one embodiment presents found data in the order of feature articles, user contributions, and journal articles, with the items in each category arranged based on relevance and/or access rights of respective contributors.

In block 636, the system stores the query and associated member-profile and/or member-contact information to the query portion of database 520. Once stored in database 520, the query is searched like any other content within the database. When query results include one or more queries the queries are presented along with the usernames associated with the queries.

In block 638, after storing the query, the system offers the contributing member an opportunity to connect with one or more other members who have made similar queries of database 520. In the exemplary embodiment, this entails defining a query based on the query and executing this query against the query data portion of database 520, more precisely user data 526. Based on the results of this query, the exemplary embodiment presents one or more usernames and related contact or biographical information for other members who have made similar contributions to the database, thereby facilitating communications between the member and other members with similar queries. Of course, the member then has the option to contact one or more of the other members. Other embodiments also presents the member options to connect with members who have published information relating to the query or to allow other members with similar questions to contact her in the future.

Figure 7:
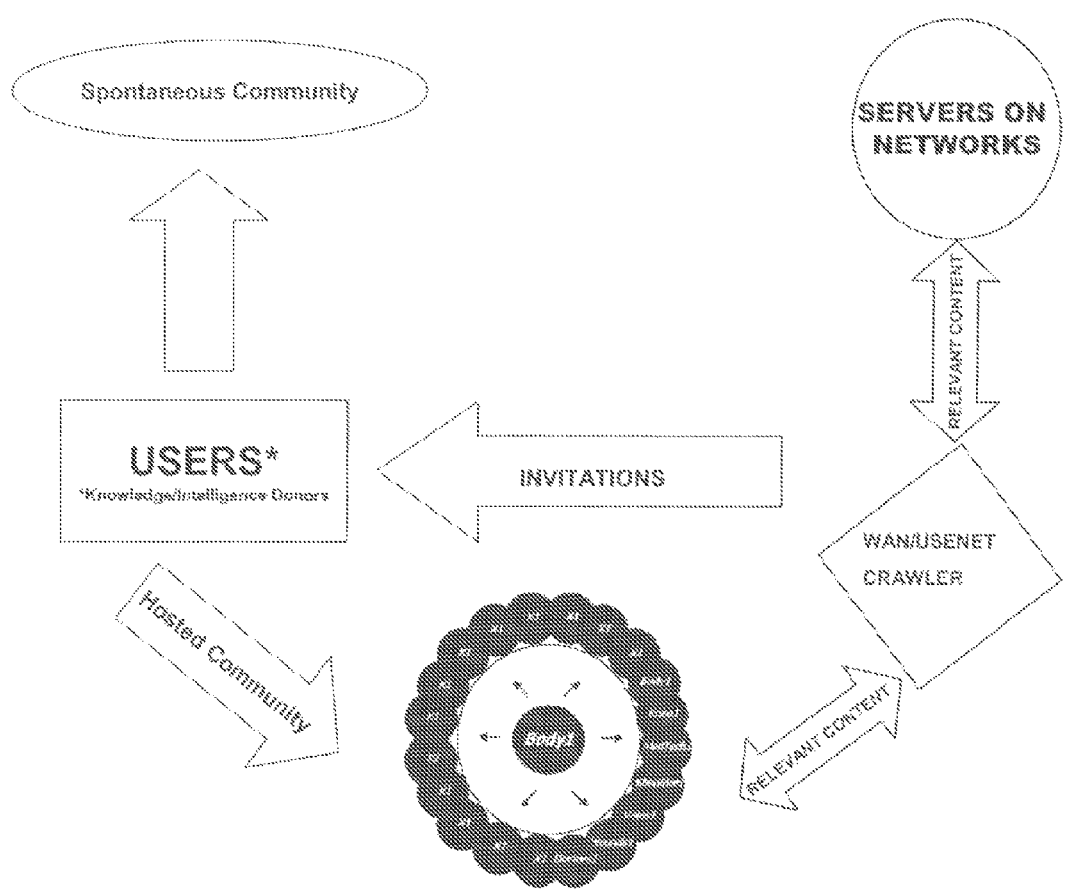
FIG. 7 is a conceptual flow diagram illustrating various online discussion modes applicable to systems 100 and 500.

FIG. 7 shows a conceptual flow diagram 700 of an exemplary method of fostering or developing online communities that are not limited to being hosted at one place at a particular time. In the diagram, the term "hosted community" refers to a community of users united in interest and by the central location of their discussion, such as at a data forum or website, but not united in time, meaning users or participants can join and leave a discussion at any time. The term "spontaneous community" refers to a community of users united in interest and time, but not by any particular central location. With use of the data-posting-and-retrieval system (denoted crawler in the figure), virtual communities of people or organizations with similar interest can be built dynamically through an automated process that identifies users of common interests, such as members of a theme-oriented website, automatically schedules an on-line meeting time, and sends invitations for a spontaneous community discussions and/or hosted communities at one or more theme-oriented websites. These hosted or spontaneous communities can bring together users from public and/or private networks, such as users of a corporate intranet, members of a particular organization, or users from a particular geographic region. These electronic, discussion-based communities can unite users sharing common interests, organization memberships, or geographical locations by bringing together contributors of valuable, relevant content.

An exemplary method procedure for creating a discussion community entails using a crawler module to identify interests based on content and keyword searches across multiple discussion groups, compile contact information for the interested users (mobile phone, email, instant messaging, etc.), schedule a spontaneous discussion and send invitations notifying users of the time and venue of the spontaneous discussion and/or a hosted discussion. This provides users the option of participating in spontaneous discussion, or contributing to a hosted discussion, with contributors of valuable information.

In this manner, the posting and retrieval system can serve as an agent for compiling interest profiles in addition to relevant content. These interest profiles can be used in combination with a scheduling module to dynamically organize spontaneous electronic discussion-based communities, that can exist over fixed or wireless media via a variety of different platforms. These electronic, discussion-based communities can unite users sharing common interests, organization memberships, or geographical locations by bringing together contributors of valuable, relevant content.

CONCLUSION

In furtherance of the art, the present inventors have presented exemplary systems, methods, and software automatically post and retrieve data from multiple online data services, such as newsgroups, message boards, etc, as well as encouraging growth of online intelligence communities by rewarding data contributions with access rights.

The embodiments described above are intended only to illustrate and teach one or more ways of making and using the present invention, not to restrict its breadth or scope. The actual scope of the invention, which embraces all ways of practicing or implementing the teachings of the invention, is defined only by one or more of the following claims and their equivalents.

The invention claimed is:

1. A method comprising:
   identifying, by a processing device, first information in a first database and second information in a second database based on user-defined criteria associated with a first user identifier;
   posting, by the processing device, third information corresponding to the first information or the second information, or any combination thereof, to a plurality of domains, wherein a first domain of the plurality corresponds to the first database and a second domain of the plurality that is different than the first domain of the plurality corresponds to the second database, the third information associated with the first user identifier;
   responsive to the posting of the third information, accessing, by the processing device, fourth information from at least one of the first database or the second database wherein the fourth information is associated with the third information;
   determining whether content added to any domain of the plurality of domains after a time of the posting of the third information corresponds to the third information;
   copying the content into an inbox in response to determining that the content added to the plurality of domains after the time of the posting of the third information corresponds to the third information;
   in response to copying the content into the inbox, determining whether to queue the content for screening;
   in response to determining to not queue the content for screening, incorporating the content into a third database that is different than the first database and different than the second database; and
   in response to determining to queue the content for screening, adding the content to a screening queue.

2. The method of claim 1, further comprising weighting, by the processing device, the user-defined criteria based on feedback corresponding to previously identified information based on the user-defined criteria.

3. The method of claim 1, wherein the third database is of a third domain that is different than the first domain and different than the second domain.

4. The method of claim 1, further comprising weighting, by the processing device, a user-based criteria based on user input.

5. The method of claim 4, further comprising:
   receiving, by the processing device, fifth information associated with a second user identifier; and
   associating, by the processing device, the first user identifier and the second user identifier based on matching content in the third information and the fifth information.

6. The method of claim 5, wherein the first information, second information, third information, fourth information or fifth information, or any combinations thereof is at least one of: an email content, a webpage content, an advertisement, or a contribution to an Internet forum discussion.

7. The method of claim 1, wherein the first information is a first content post on a first webpage and the second information is a second content post on a second webpage.

8. The method of claim 7, wherein the third information is a reply to the first content post and to the second content post.

9. The method of claim 8, wherein the fourth information is a follow-up reply to the reply to the first content post or to the second content post.

10. The method of claim 1, further comprising associating, by the processing device, the first information, second information, third information and fourth information with the first user identifier.

11. The method of claim 1, further comprising associating, by the processing device, the first user identifier with a group of user identifiers based on matching content in the third information and information associated with each of the user identifiers of the group.

12. The method of claim 11, further comprising associating, by the processing device, the group of user identifiers with a content identifier.

13. The method of claim 11, further comprising associating, by the processing device, the group of user identifiers with a content theme.

14. The method of claim 1, further comprising associating, by the processing device, the user identifier with a group of user identifiers.

15. The method of claim 1, further comprising indexing, by the processing device, the first information or the second information, or any combination thereof.

16. The method of claim 1, further comprising vetting, by the processing device, first information, second information, third information or fourth information based on at least one of: authorship, source, content, redundancy and copyright.

17. An apparatus comprising:
   means for identifying first information in a first database and second information in a second database based on user-defined criteria associated with a first user identifier;
   means for posting third information corresponding to the first information or the second information, or any combination thereof, to a plurality of domains, wherein a first domain of the plurality corresponds to the first database and a second domain of the plurality that is different than the first domain of the plurality corresponds to the second database, the third information associated with the first user identifier;
   means for accessing fourth information from at least one of the first database or the second database responsive to the posting of the third information, wherein the fourth information is associated with the third information;
   means for determining whether content added to any domain of the plurality of domains after a time of the posting of the third information corresponds to the third information;
   means for copying the content into an inbox in response to determining that the content added to the plurality of domains after the time of the posting of the third information corresponds to the third information;
   means for determining whether to queue the content for screening in response to copying the content into the inbox;
   means for incorporating the content into a third database that is different than the first database and different than the second database in response to determining to not queue the content for screening; and
   means for adding the content to a screening queue in response to determining to queue the content for screening.

18. The apparatus of claim 17, further comprising means for weighting the user-defined criteria based on feedback corresponding to previously identified information based on the user-defined criteria.

19. The apparatus of claim 17, wherein the third database is of a third domain that is different than the first domain and different than the second domain.

20. The apparatus of claim 17, further comprising means for weighting the user-based criteria based on user input.

21. The apparatus of claim 20, further comprising:
   means for receiving fifth information associated with a second user identifier; and
   means for associating the first user identifier and the second user identifier based on matching content in the third information and the fifth information.

22. The apparatus of claim 21, wherein the first information, second information, third information, fourth information or fifth information, or any combinations thereof is at least one of: an email content, a webpage content, an advertisement, or a contribution to an Internet forum discussion.

23. The apparatus of claim 17, wherein the first information is a first content post on a first webpage and the second information is a second content post on a second webpage.

24. The apparatus of claim 23, wherein the third information is a reply to both the first content post and to the second content post.

25. The apparatus of claim 24, wherein the fourth information is a follow-up reply to the reply to the first content post or to the second content post.

26. The apparatus of claim 17, further comprising means for associating the first information, second information, third information and fourth information with the first user identifier.

27. The apparatus of claim 17, further comprising means for associating the first user identifier with a group of user identifiers based on matching content in the third information and information associated with each of the user identifiers of the group.

28. The apparatus of claim 17, further comprising means for associating the group of user identifiers with a content identifier.

29. The apparatus of claim 17, further comprising means for associating the user identifier with a group of user identifiers.

30. The apparatus of claim 17, further comprising means for associating the group of user identifiers with a content theme.

31. The apparatus of claim 17, further comprising means for indexing the first information or the second information, or any combination thereof.

32. The apparatus of claim 17, further comprising means for vetting first information, second information, third information or fourth information based on at least one of: authorship, source, content, redundancy and copyright.

33. An apparatus, comprising:
   a memory device configured to store instructions associated with an application program; and
   a processing device that, in response to executing the instructions stored in the memory device, is configured to:
   identify first information in a first database and second information in a second database based on user-defined criteria associated with a first user identifier;
   post third information corresponding to the first information or the second information, or any combination thereof, to a plurality of domains, wherein a first domain of the plurality corresponds to the first database a second domain of the plurality that is different than the first domain of the plurality corresponds to and the second database, the third information associated with the first user identifier;
   responsive to the posting of the third information, access fourth information from at least one of the first database or the second database wherein the fourth information is associated with the third information;
   determine whether content added to any domain of the plurality of domains after a time of the posting of the third information corresponds to the third information;
   copy the content into an inbox in response to determining that the content added to the plurality of domains after the time of posting of the third information corresponds to the third information;
   in response to copying the content into the inbox, determine whether to queue the content for screening;

in response to determining to not queue the content for screening, incorporate the content into a third database that is different than the first database and different than the second database; and in response to determining to queue the content for screening, add the content to a screening queue.

34. The apparatus of claim 33, wherein the processing device is further configured to weight the user-defined criteria based on feedback corresponding to previously identified information based on the user-defined criteria.

35. The apparatus of claim 33, wherein the third database is of a third domain that is different than the first domain and different than the second domain.

36. The apparatus of claim 33, wherein the processing device is further configured to weight the user-defined criteria based on user input.

37. The apparatus of claim 36, wherein the processing device is further configured to:
receive fifth information associated with a second user identifier; and
associate the first user identifier and the second user identifier based on matching content in the third information and the fifth information.

38. The apparatus of claim 33, wherein the first information is a first content post on a first webpage and the second information is a second content post on a second webpage.

39. The apparatus of claim 38, wherein the third information is a reply to both the first content post and to the second content post.

40. The apparatus of claim 39, wherein the fourth information is a follow-up reply to the reply to the first content post or to the second content post.

41. The apparatus of claim 33, wherein the processing device is further configured to associate the first information, second information, third information and fourth information with the first user identifier.

42. The apparatus of claim 33, wherein the processing device is further configured to associate the first user identifier with a group of user identifiers based on matching content in the third information and information associated with each of the user identifiers of the group.

43. The apparatus of claim 42, wherein the processing device is further configured to associate the group of user identifiers with a content identifier.

44. The apparatus of claim 42, wherein the processing device is further configured to associate the group of user identifiers with a content theme.

45. The apparatus of claim 33, wherein the processing device is further configured to associate the user identifier with a group of user identifiers.

46. The apparatus of claim 33, wherein the processing device is further configured to index the first information or the second information, or any combination thereof.

47. The apparatus of claim 33, wherein the processing device is further configured to vet first information, second information, third information or fourth information based on at least one of: authorship, source, content, redundancy and copyright.

48. The apparatus of claim 37, wherein the first information, second information, third information, fourth information or fifth information, or any combinations thereof is at least one of: an email content, a webpage content, an advertisement, or a contribution to an Internet forum discussion.

49. A computer-readable memory device having instructions stored thereon that, in response to execution by a processing device, cause the processing device to perform operations comprising:

identifying first information in a first database and second information in a second database based on user-defined criteria associated with a first user identifier;

posting third information corresponding to the first information or the second information, or any combination thereof, to a plurality of domains, wherein a first domain of the plurality corresponds to the first database and a second domain of the plurality that is different than the first domain of the plurality corresponds to the second database, the third information associated with the first user identifier;

responsive to the posting of the third information, accessing fourth information from at least one of the first database or the second database wherein the fourth information is associated with the third information;

determining whether content added to any domain of the plurality of domains after a time of the posting of the third information corresponds to the third information;

copying the content into an inbox in response to determining that the content added to the plurality of domains after the time of posting of the third information corresponds to the third information;

in response to copying the content into the inbox, determining whether to queue the content for screening;

in response to determining to not queue the content for screening, incorporating the content into a third database that is different than the first database and different than the second database; and in response to determining to queue the content for screening, adding the content to a screening queue.

50. The computer-readable memory device of claim 49, wherein the operations further comprise weighting the user-defined criteria based on feedback corresponding to previously identified information based on the user-defined criteria.

51. The computer-readable memory device of claim 49, wherein the third database is of a third domain that is different than the first domain and different than the second domain.

52. The computer-readable memory device of claim 49, wherein the operations further comprise weighting the user-based criteria based on user input.

53. The computer-readable memory device of claim 52, wherein the operations further comprise:
receiving fifth information associated with a second user identifier; and
associating the first user identifier and the second user identifier based on matching content in the third information and the fifth information.

54. The computer-readable memory device of claim 53, wherein the first information, second information, third information, fourth information or fifth information, or any combinations thereof is at least one of: an email content, a webpage content, an advertisement, or a contribution to an Internet forum discussion.

55. The computer-readable memory device of claim 49, wherein the first information is a first content post on a first webpage and the second information is a second content post on a second webpage.

56. The computer-readable memory device of claim 55, wherein the third information is a reply to both the first content post and to the second content post.

57. The computer-readable memory device of claim 56, wherein the fourth information is a follow-up reply to the reply to the first content post or to the second content post.

58. The computer-readable memory device of claim 49, wherein the operations further comprise associating the first information, second information, third information and fourth information with the first user identifier.

59. The computer-readable memory device of claim 49, wherein the operations further comprise associating the first user identifier with a group of user identifiers based on matching content in the third information and information associated with each of the user identifiers of the group.

60. The computer-readable memory device of claim 59, wherein the operations further comprise associating the group of user identifiers with a content identifier.

61. The computer-readable memory device of claim 59, wherein the operations further comprise associating the group of user identifiers with a content theme.

62. The computer-readable memory device of claim 49, wherein the operations further comprise associating the user identifier with a group of user identifiers.

63. The computer-readable memory device of claim 49, wherein the operations further comprise indexing the first information or the second information, or any combination thereof.

64. The computer-readable memory device of claim 49, wherein the operations further comprise vetting first information, second information, third information or fourth information based on at least one of: authorship, source, content, redundancy and copyright.

* * * * *